United States Patent
Lee et al.

(10) Patent No.: US 9,055,503 B2
(45) Date of Patent: Jun. 9, 2015

(54) SELECTING A TARGET CELL FOR CS FALLBACK

(75) Inventors: Ki-Ho Lee, Gyeonggi-do (KR); Yong-Gyoo Lee, Seoul (KR); Yung-Ha Ji, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 13/563,918

(22) Filed: Aug. 1, 2012

(65) Prior Publication Data

US 2013/0051362 A1 Feb. 28, 2013

(30) Foreign Application Priority Data

Aug. 1, 2011 (KR) ........................ 10-2011-0076581

(51) Int. Cl.
| | |
|---|---|
| *H04L 1/00* | (2006.01) |
| *H04W 36/30* | (2009.01) |
| *H04W 36/24* | (2009.01) |
| *H04W 36/16* | (2009.01) |
| *H04W 36/14* | (2009.01) |
| *H04W 88/06* | (2009.01) |

(52) U.S. Cl.
CPC ............. *H04W 36/30* (2013.01); *H04W 36/24* (2013.01); *H04W 36/16* (2013.01); *H04W 36/14* (2013.01); *H04W 88/06* (2013.01)

(58) Field of Classification Search
CPC ...... H04W 36/14; H04W 36/30; H04W 88/06
USPC .......... 370/328, 331, 332, 252; 455/450, 436, 455/435.1, 437
See application file for complete search history.

(56) References Cited

U.S. PATENT DOCUMENTS

| | | |
|---|---|---|
| 6,452,922 B1 | 9/2002 | Ho |
| 7,796,514 B2 | 9/2010 | Noriega |
| (Continued) | | |

FOREIGN PATENT DOCUMENTS

| | | |
|---|---|---|
| JP | 2011-091587 A | 5/2011 |
| JP | 2011-147069 A | 7/2011 |
| (Continued) | | |

OTHER PUBLICATIONS

3GPP, Digital cellular telecommunications system (Phase 2+); Universal Mobile Telecommunications. System (UMTS); LTE; Circuit Switched Fallback in Evolved Packet System; Stage 2, 3GPP TS 23.272 version 9.6.0 Release 9, Jan. 2011, hereinafter known as 3GPP, accessed on Nov. 6, 2013 via: http://www.etsi.org/deliver/etsi_ts/123200_123299/123272/09.0.*

(Continued)

*Primary Examiner* — Andrew Lai
*Assistant Examiner* — Jamaal Henson
(74) *Attorney, Agent, or Firm* — IP Legal Services, LLC (57) ABSTRACT

Described embodiments provide a method of effectively selecting a target cell to hand over user equipment from a LTE network to a non-LTE network when the user equipment requests a CS service. A LTE cell may determine a CS fallback hysteresis parameter in advance. The LTE cell may receive signal quality measurements of at least two candidate non-LTE cells from the user equipment. The LTE cell may select one target cell among the at least two candidate non-LTE cells based on the CS fallback hysteresis parameter and the received signal quality measurements of the at least two candidate non-LTE cells.

16 Claims, 7 Drawing Sheets

(56) References Cited

U.S. PATENT DOCUMENTS

| | | |
|---|---|---|
| 8,125,960 B2 | 2/2012 | Iwamura et al. |
| 8,515,486 B2 | 8/2013 | Miyata |
| 2006/0178153 A1 | 8/2006 | Tenny et al. |
| 2008/0318574 A1 | 12/2008 | Bi |
| 2009/0149180 A1 | 6/2009 | Kitazoe |
| 2009/0168725 A1 | 7/2009 | Mishra |
| 2009/0238143 A1 | 9/2009 | Mukherjee et al. |
| 2010/0008324 A1 | 1/2010 | Lee et al. |
| 2010/0015978 A1 | 1/2010 | Yoon et al. |
| 2010/0075679 A1 | 3/2010 | Tenny et al. |
| 2010/0202413 A1 * | 8/2010 | Vikberg et al. ............... 370/332 |
| 2010/0222071 A1 | 9/2010 | Tafreshi et al. |
| 2010/0278142 A1 | 11/2010 | Dwyer et al. |
| 2010/0316000 A1 | 12/2010 | Burbidge et al. |
| 2011/0013560 A1 | 1/2011 | Zhang et al. |
| 2011/0064052 A1 | 3/2011 | Lee |
| 2011/0092214 A1 | 4/2011 | Iwamura |
| 2011/0171962 A1 * | 7/2011 | Iwamura et al. ............... 455/437 |
| 2012/0015646 A1 | 1/2012 | Burbidge et al. |
| 2012/0163249 A1 | 6/2012 | Chin et al. |
| 2012/0165065 A1 | 6/2012 | Sawada et al. |
| 2012/0170503 A1 | 7/2012 | Kelley et al. |

FOREIGN PATENT DOCUMENTS

| | | |
|---|---|---|
| KR | 10-2005-0068400 A | 7/2005 |
| KR | 10-2005-0121136 A | 12/2005 |
| KR | 10-2007-0110348 A | 11/2007 |
| KR | 10-2008-0026855 A | 3/2008 |
| KR | 10-2008-0080801 A | 9/2008 |
| KR | 10-0920894 B1 | 10/2009 |
| KR | 10-2010-0003664 A | 1/2010 |
| KR | 10-2010-0004833 A | 1/2010 |
| KR | 10-2010-0021156 A | 2/2010 |
| KR | 10-2010-0021478 A | 2/2010 |
| KR | 10-2010-0029869 A | 3/2010 |
| KR | 10-2010-0060353 A | 6/2010 |
| KR | 10-2010-0092742 A | 8/2010 |
| KR | 10-2010-0117752 A | 11/2010 |
| KR | 10-2010-0126776 A | 12/2010 |
| KR | 10-2010-0126818 A | 12/2010 |
| KR | 10-2010-0130211 A | 12/2010 |
| KR | 10-2010-0133821 A | 12/2010 |
| KR | 10-2011-0030051 A | 3/2011 |
| KR | 10-2011-0099327 A | 9/2011 |
| WO | 2010/127435 A1 | 11/2010 |
| WO | 2011/024656 A | 3/2011 |

OTHER PUBLICATIONS

3GPP TS 23.272 version 9.4.0, "3rd Generation Partnership Project; Technical Specification Group Services and System Aspects; Circuit Switched(CS) fallback in Evolved Packet Sustem(EPS); Stage 2 (Release 9)", ETSI, Jun. 2010, pp. 1-73, Section 4.3.2-4.3.4, France.

* cited by examiner

SELECTING A TARGET CELL FOR CS FALLBACK

CROSS REFERENCE TO PRIOR APPLICATIONS

The present application claims priority under 35 U.S.C. §119 to Korean Patent Application No. 10-2011-0076581 (filed on Aug. 1, 2011), which is hereby incorporated by reference in its entirety.

The subject meter of this application is related to U.S. patent application Ser. No. 13/569,321 filed Aug. 8, 2012, the teachings of which are incorporated herein in their entirety by reference.

FIELD OF THE INVENTION

The present invention relates to communications and, in particular, to selecting a target cell for circuit switched (CS) fallback.

BACKGROUND OF THE INVENTION

Long term evolution (LTE) may be a standard for wireless data communication technology that delivers a high data rate, low latency and packet optimized radio access technology. LTE, however, supports only a packet switched (PS) service while a universal mobile telecommunications system radio access network (UTRAN) supports both of a circuit switched (CS) service and a packet switched (PS) service. In order to provide a CS service in a LTE network, circuit switched (CS) fallback may be employed in the LTE network.

The CS fallback may enable the provisioning of voice and other CS services by reuse of a GSM/EDGE radio access network (GERAN) or a UTRAN CS infrastructure when user equipment is served by a LTE network. GSM may by an abbreviation of a global system for mobile communications and EDGE may be abbreviation of enhanced data rates for GSM evolution. The CS fallback is only available if LTE service coverage is overlapped with service coverage of a GERAN or a UTRAN CS network. For example, in the LTE network, a CS fallback procedure may hand over user equipment from a serving LTE cell to an associated non-LTE cell in order to process a mobile originated (MO) call or a mobile terminated (MT) call while the user equipment is camping on the serving LTE cell. The non-LTE cell may be a GERAN cell or a UTRAN cell. The LTE cell may be mapped to a corresponding non-LTE cell in one to one relation. A CS fallback call may be transferred from the serving LTE cell to the corresponding non-LTE cell in the CS fallback procedure.

When user equipment is located at a boundary of two adjacent LTE cells, user equipment may be handed over from a serving LTE cell to a target LTE cell. Such a handover from a LTE cell to another LTE cell may be initiated when the target LTE cell has a significantly better communication environment than the serving LTE cell. Accordingly, a service area of the serving LTE cell may expand toward a service area of the target LTE cell. If user equipment performs a CS fallback procedure for processing a CS service, such as a mobile originated call and a mobile terminated call, while the user equipment is located at such expanded service area of the serving LTE cell, the CS fallback procedure may hand over the user equipment to an undesired non-LTE cell, causing unnecessary location registration, delaying an entire process of handling such a CS service.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a target cell may be selected for CS fallback based on a CS fallback parameter and signal quality measurements of non-LTE candidate cells.

In accordance with another aspect of the present invention, a CS fallback parameter may be set with a predetermined value corresponding to a type of a signal quality measured in user equipment, and the CS fallback parameter may be considered to select a target cell for CS fallback.

In accordance with still another aspect of the present invention, a signal quality measurement of a non-LTE cell mapped to a serving LTE cell may be added with a CS fallback parameter and the adding result may be compared with a signal quality measurement of a neighbor non-LTE cell mapped to a neighbor LTE cell that user equipment enters into.

In accordance with still another aspect of the present invention, a neighbor non-LTE cell mapped to a neighbor LTE cell of a serving LTE cell may be selected as a target cell for CS fallback only if a signal quality measurement of the neighbor non-LTE cell is significantly greater than a signal quality measurement of a non-LTE cell mapped to the serving LTE cell.

In accordance with an embodiment of the present invention, a method may be provided for selecting a target cell of a second network providing a circuit switched (CS) service for handover of user equipment camping on a first network providing only a packet switched (PS) service when the user equipment requests the CS service. The method may include determining a CS fallback hysteresis parameter, receiving signal quality measurements of at least two candidate cells of the second network from the user equipment, and selecting one target cell among the at least two candidate cells of the second network based on the CS fallback hysteresis parameter and the received signal quality measurements of the at least two candidate cells of the second network.

The CS fallback hysteresis parameter may be a predetermined value added to the received signal quality measurements of one candidate cell mapped to a serving cell of the first network, which the user equipment is currently camping on.

The determining a CS fallback hysteresis parameter may include setting the CS fallback hysteresis parameter with a predetermined value based on a type of signal quality measured as the signal quality measurement of the at least two candidate cells of the second network.

The signal quality measurement may be a result of measuring a signal quality of each candidate cell of the second network.

The signal quality may be one of a received signal code power (RSCP) and a signal to interference noise ratio (SINR).

At least two candidate cells of the second network may include a first candidate cell and a second candidate cell. The first candidate cell may be mapped to a serving first network cell where the user equipment is currently camping on. The second candidate cell may be mapped to a neighbor first network cell where the user equipment enters into.

The receiving signal quality measurements of at least two candidate cells of the second network may include measuring, by the user equipment, a first signal quality of the first candidate cell and a second signal quality of the second candidate cell and transmitting, by the user equipment, results of the measuring of the first signal quality and the second signal quality to the serving first network cell.

The selecting one target cell among the at least two candidate cells of the second network may include adding the CS fallback hysteresis parameter to first received signal quality measurement of the first candidate cell among the at least two candidate cells of the second network, comparing the adding result with second received signal quality measurement of the second candidate cell, and selecting, as the target cell, one of the first candidate cell and the second candidate cell based on the comparison result.

The selecting the target cell may include selecting the first candidate cell as the target cell when the adding result is equal to or greater than the second received signal quality of the second candidate cell and selecting the second candidate cell as the target cell when the adding result is smaller than the second received signal quality of the second candidate cell.

The first network may be a long term evolution (LTE) network and the second network may be a universal mobile telecommunications system radio access network (UTRAN).

The method may further include performing a CS fallback procedure with the selected target cell.

In accordance with another embodiment of the present invention, a method may be provided for selecting, in a long term evolution (LTE) cell, one of non-LTE cells as a target cell for circuit switched (CS) fallback in a communication environment where a LTE network overlaps with a non-LTE network. The method may include selecting one of a first non-LTE candidate cell and a second non-LTE candidate cell as the target cell based on a CS fallback hysteresis parameter and first and second signal quality measurements of the first and second non-LTE candidate cells and performing a CS fallback procedure based on the selected target non-LTE cell. The first non-LTE candidate cell may be mapped to a serving LTE cell where user equipment is currently camping on. The second non-LTE candidate cell may be mapped to a neighbor LTE cell that the user equipment enters into.

The selecting one non-LTE cell may include adding the CS fallback hysteresis parameter to the first signal quality measurement of the first non-LTE candidate cell, comparing the adding result with the second signal quality measurement of the second non-LTE candidate cell, determining the first non-LTE candidate cell as the target cell for CS fallback when the adding result is equal to or greater than the second signal quality measurement of the second non-LTE candidate cell, otherwise, determining the second non-LTE candidate cell as the target cell.

The method may further include setting the CS fallback parameter with a predetermined value corresponding to a type of a signal quality measured in the user equipment. The type of a signal quality measured in the user equipment may be one of a received signal code power (RSCP) and a signal to noise ratio (SINR).

The selecting one of a first non-LTE candidate cell and a second non-LTE candidate cell as the target cell may include determining the first non-LTE candidate cell and the second non-LTE candidate cell based on a mapping table stored in the serving LTE cell. The mapping table may contain information on mapping relations of LTE cells and non-LTE cells.

In accordance with still another embodiment of the present invention, an apparatus may be provided for selecting one of non-LTE cells as a target cell for circuit switched (CS) fallback in a communication environment where a LTE network overlaps with a non-LTE network. The apparatus may include a parameter setup unit, a receiver, and a CS fallback handover controller. The parameter setup unit may be configured to set a CS fallback parameter with a predetermined value. The receiver may be configured to receive, from user equipment, a first signal quality measurement of a first non-LTE candidate cell and a second signal quality measurement of a second non-LTE candidate cell. The CS fallback handover controller may be configured to select one of the first non-LTE candidate cell and the second non-LTE candidate cell as the target cell for CS fallback based on the CS fallback parameter and the received first and second quality measurements. The first non-LTE candidate cell may be mapped to a serving LTE cell associated with the apparatus. The second non-LTE candidate cell may be mapped to a neighbor LTE cell of the serving LTE cell.

The parameter setup unit may be configured to determine the predetermined value of the CS fallback parameter corresponding to a type of a signal quality measured in the user equipment. The type of a signal quality measured in the user equipment may be one of a received signal code power (RSCP) and a signal to noise ratio (SINR).

The CS fallback handover controller may be configured to add the CS fallback hysteresis parameter to the received first signal quality measurement of the first non-LTE candidate cell, to compare the adding result with the received second signal quality measurement of the second non-LTE candidate cell, and to determine the first non-LTE candidate cell as the target cell for CS fallback when the adding result is equal to or greater than the second signal quality measurement of the second non-LTE candidate cell. Otherwise, the CS fallback handover controller may be configured to determine the second non-LTE candidate cell as the target cell.

The apparatus may be embodied in an evolved NodeB (eNodeB). The apparatus may be configured to initiate handover of the user equipment to the selected target cell during a CS fallback procedure.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Reference will now be made in detail to embodiments of the present invention, examples of which are illustrated in the accompanying drawings, wherein like reference numerals refer to like elements throughout. The embodiments are described below, in order to explain the present invention by referring to the figures.

As described, CS fallback may be available only where a LTE network co-exists with a non-LTE network such as a GERAN and/or a UTRAN. Such a mobile communication environment will be described with reference to FIG. 1. For convenience and ease of understanding, a UTRAN CS network will be described as a non-LTE network throughout the specification, but the present invention is not limited thereto. The non-LTE network may be a GERAN in accordance with another embodiment of the present invention.

Figure 1:
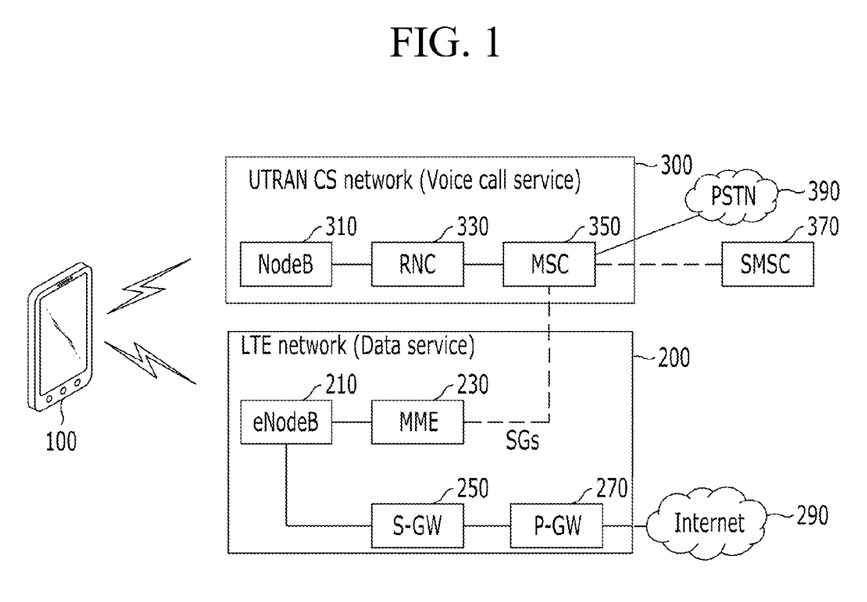
FIG. 1 shows a mobile communication environment where circuit switched (CS) fallback is available in accordance with embodiments of the present invention.

FIG. 1 shows a mobile communication environment where CS fallback is available in accordance with embodiments of the present invention.

As shown in FIG. 1, the CS fallback may be available where LTE network 200 overlaps with UTRAN CS network 300. The CS fallback may enable user equipment 100 camping on a LTE cell to use a CS service by using resources of UTRAN CS network 300. The CS service may include a voice service, a video service, a short message service (SMS), a location service (LCS), an unstructured supplementary service data (USSD), and likes.

User equipment 100 may be a user device for receiving various types of services, such as a CS service and a PS service. Particularly, user equipment 100 may support a CS fallback function and be capable of accessing LTE network 200 as well as accessing UTRAN CS network 300 in accordance with embodiments of the present invention. Accordingly, user equipment 100 may hand over a CS fallback call from a serving LTE cell to a corresponding UTRAN cell in the mobile communication environment shown in FIG. 1.

Referring to FIG. 1, LTE network 200 may include evolved NodeB (eNodeB) 210, mobility management entity (MME) 230, serving gateway (S-GW) 250, and packet data network gateway (P-GW) 270. LTE network 200 may be connected to Internet 290. LTE network 200 may provide only a PS service to user equipment 100 camping on corresponding eNodeB 210 which is a LTE cell base station.

eNodeB 210 may be a base station of a LTE cell in LTE network 200. eNodeB 210 may support a function for transmitting a paging request to user equipment 100 for CS fallback and a function for transferring a SMS message to user equipment 100 in accordance with embodiments of the present invention. Furthermore, eNodeB 210 may support a function of directly accessing a related UTRAN cell base station, such as a NodeB, for CS fallback.

MME 230 may be a control node for LTE network 200. In accordance with embodiments of the present invention, MME 230 may support the CS fallback. In order to support the CS fallback, MME 230 may have a function of selecting multiple public land mobile networks (PLMN)(not shown) for a CS domain and a function of selecting a radio access technology for a CS domain. Furthermore, MME 230 may derive a visiting location registration (VLR) number and a location area identity (LAI) from a tracking area identify (TAI) of the current cell and based on the selected PLMN or the selected RAT for CS domain, or using a default VLR number and LAI. MME 230 may deliver the registered PLMN ID for CS domain included in the LAI to eNodeB 210. MME 230 may deliver a registered PLMN ID for a CS domain to eNodeB 210. MME 230 may initiate a paging procedure towards eNodeB 210 when user equipment 100 is paged for CS services. MME 230 may support combined evolved packet system/international mobile subscriber identity (EPS/IMSI) attach procedure, a combined tracking area/location area (TA/LA) update procedure, and a detach procedure. Furthermore, MME 230 may process a SMS message. MME 230 may establish and manage a SGs interface to mobile switching center (MSC) 350 of UTRAN CS network 300.

S-GW 250 may route and forward user data packets. Furthermore, S-GW 260 may function as the mobility anchor when user equipment 100 is handed over between a LTE cell to a non-LTE cell.

P-GW 270 may provide connectivity from user equipment 100 to an external packet data network such as Internet 290. P-GW 270 may function as exit and/or entry of traffic for user equipment 100. Furthermore, P-GW 270 may allocate an Internet protocol (IP) address of user equipment 100 and perform operations associated with packet data of a core network. P-GW 270 may be a mobility anchor when user equipment moves between $3^{rd}$ generation partnership project (3GPP) radio network and non-3GPP radio network such as worldwide interoperability for microwave access (WiMAX). P-GW 270 may be referred to as a PDN gateway.

UTRAN CS network 300 may support a CS service as well as a PS service. User equipment 100 may be handed over from LTE network 200 to UTRAN CS network 300 for CS fallback when user equipment 100 is camping on a LTE cell in LTE network 200 and attempts to use a CS service such as a voice call in accordance with embodiments of the present invention. UTRAN CS network 300 may include NodeB 310, radio network controller (RNC) 330, mobile switching center (MSC) 350, and short message service center (SMSC) 370. UTRAN CS network 300 may be connected to public switched telephone network (PSTN) 390.

NodeB 310 and RNC 330 may be a radio access network in UTRAN CS network 300. NodeB 310 and RNC 330 may employ asynchronous transfer mode (ATM). NodeB 310 and RNC 330 may be located between user equipment 100 and a wireless communication core network and transfer data and control information. NodeB 310 may be a base station of a UTRAN cell in UTRAN CS network 300. NodeB 310 may support the CS fallback. RNC 330 may control and manage NodeB 310 that is connected thereto. RNC 330 may carry out radio resource management and mobility management. RNC 330 may encrypt user data before the user data is sent to user equipment 100.

MSC 350 may support the CS fallback in accordance with embodiments of the present invention. In order to support the CS fallback, MSC 350 may perform operations associated with a combined EPS/IMSI attach procedure, a combined TA/LA update procedure, a detach procedure, and a SMS message in cooperation with MME 230 of LTE network 200. MSC 350 may maintain a SGs interface to MME 230. For the CS fallback function, the combined EPS/IMSI attached procedure, the combined TA/LS update procedure, and the detach procedure may be performed in advance for mobility management. These procedures may be referred to as a location registration procedure.

The CS fallback between LTE network 200 and UTRAN CS network 300 may be realized through three schemes as shown in Table 1.

TABLE 1

| CS fallback scheme | Description |
|---|---|
| Basic Redirection | Simply handover user equipment from a LTE network to a UTRAN CS network. It might generate a voice call connection delay.<br>Establish a SGs interface between MSC and MME for interaction between a LTE network and a UTRAN CS network.<br>Originated CS call setup time: about 3.8 second (1.5 second additionally required) |
| Redirection with SI | Provide UTRAN target cell information from a UTRAN CS network to a LTE network in advance.<br>eNodeB is required to set WCDMA SI of a target cell (automatically or manually)<br>Originated CS call setup time: about 2.6 second (0.3 second additionally required) |
| PS handover | Transmit and receive a voice call after handover from LTE network to UTRAN<br>Cause additional signaling load for processing call handover.<br>Originated CS call setup time: about 2.8 second (0.5 second additionally required). |

Referring to Table 1, the basic redirection scheme may i) release connection to LTE network 200 for a CS fallback call and ii) establish connection to UTRAN CS network 300. The CS fallback redirection with SI scheme may provide system information (SI) of UTRAN CS network 300, manually or automatically, to LTE network 200 in advance. Accordingly, a call setup delay may be shortened in the CS fallback redirection with SI scheme. The PS handover scheme may handover user equipment 100 from LTE network 200 to UTRAN CS network 300 for processing a CS fallback call.

Among the three schemes, the redirection with SI scheme and the PS handover scheme may provide, in advance, system information of a target cell such as a UTRAN cell (WCDMA cell) to a LTE cell base station. In accordance with embodiments of the present invention, a CS fallback hysteresis parameter may be provided to the LTE cell base station when the system information is provided. Based on the LTE cell base station may use the CS fallback hysteresis parameter to select a target UTRAN base station for CS fallback handover in accordance with embodiments of the present invention. Accordingly, embodiments of the present invention may be applicable to the Redirection with SI scheme and the PS handover scheme. Hereinafter, a CS fallback procedure performed upon the arrival of a voice call in accordance with embodiments of the present invention will be described with reference to FIG. 2A and FIG. 2B.

Figure 2A:
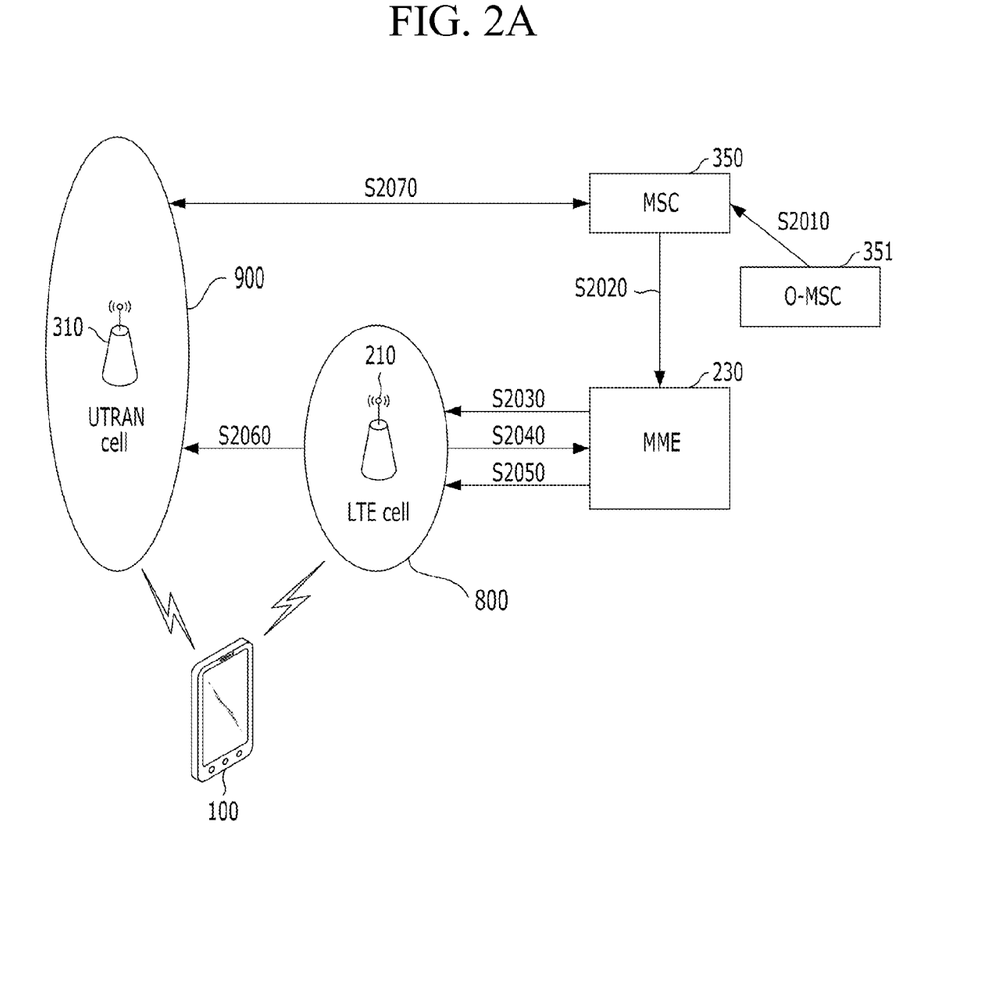
FIGS. 2A and 2B show a CS fallback procedure performed upon the arrival of a voice call in accordance with embodiments of the present invention.
Figure 2B:
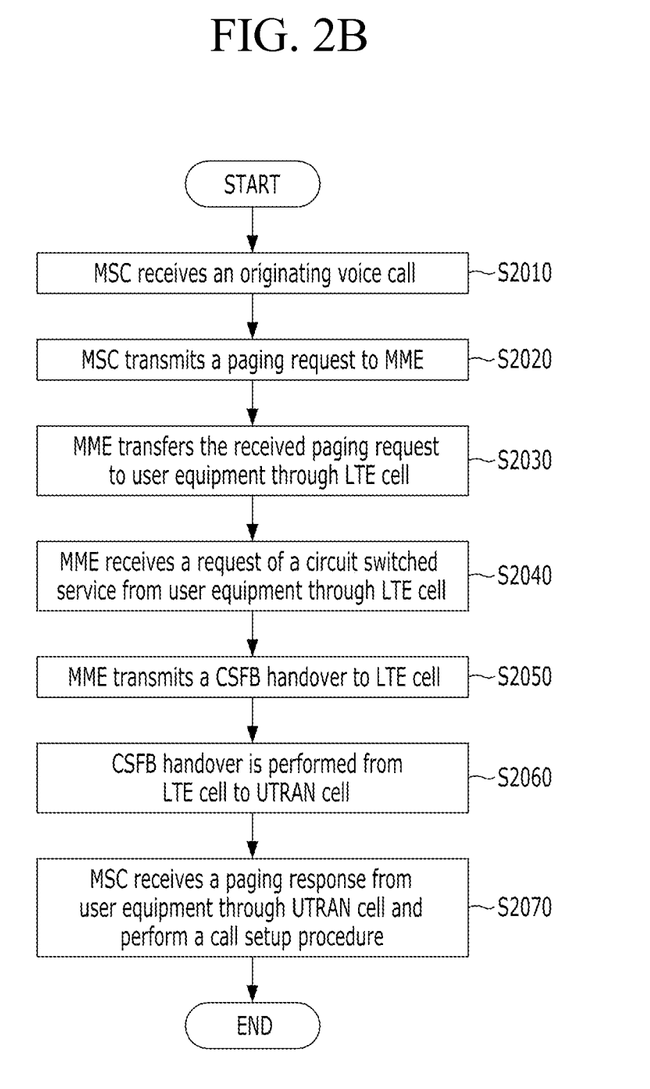

FIGS. 2A and 2B show a CS fallback procedure performed upon the arrival of a voice call in accordance with embodiments of the present invention.

Referring to FIG. 2A and FIG. 2B, MSC 350 of UTRAN CS network 300 may receive a voice call originated from originating MSC (O-MSC) 351 at step S2010. For example, O-MSC 351 may deliver the originated voice call to MSC 350. Before the receipt of the voice call, MSC 350 of UTRAN CS network 300 may provide system information (SI) of UTRAN CS network 300 to user equipment 100 camping on LTE cell 2010 which is managed by eNodeB 210 of LTE network 200.

At step S2020, MSC 350 of UTRAN CS network 300 may transmit a paging request to MME 230 of LTE network 200 using a generic security service application protocol (GSsAP). At step S2030, MME 230 of LTE network 200 may deliver the received paging request to user equipment 100 through LTE cell 800.

At step S2040, MME 230 of LTE network 200 may receive a CS service request from user equipment 100 through LTE cell 800 in response to the paging request. At step S2050, MME 230 of LTE network 200 may transmit a handover command to LTE cell 800.

At step S2060, user equipment 100 may perform a handover procedure from LTE cell 800 to UTRAN cell 900. UTRAN cell 900 may be a UTRAN cell mapped to serving LTE cell 800 of user equipment 100. As a result, user equipment 100 may complete hand over from LTE cell 800 to UTRAN cell 900. At step S2070, MSC 350 of UTRAN CS network 300 may receive a paging response from user equipment 100 through UTRAN cell 900. Furthermore, MSC 350 of UTRAN CS network 300 may perform a call setup procedure. After the call setup procedure, a voice call service may be provided to user equipment 100 through UTRAN cell 900 in accordance with embodiments of the present invention.

As described above, LTE cell 800 may be mapped to UTRAN cell 900 for the CS fallback. Such mapping relation between LTE cells and UTRAN cells will be described with reference to FIG. 3.

Figure 3:
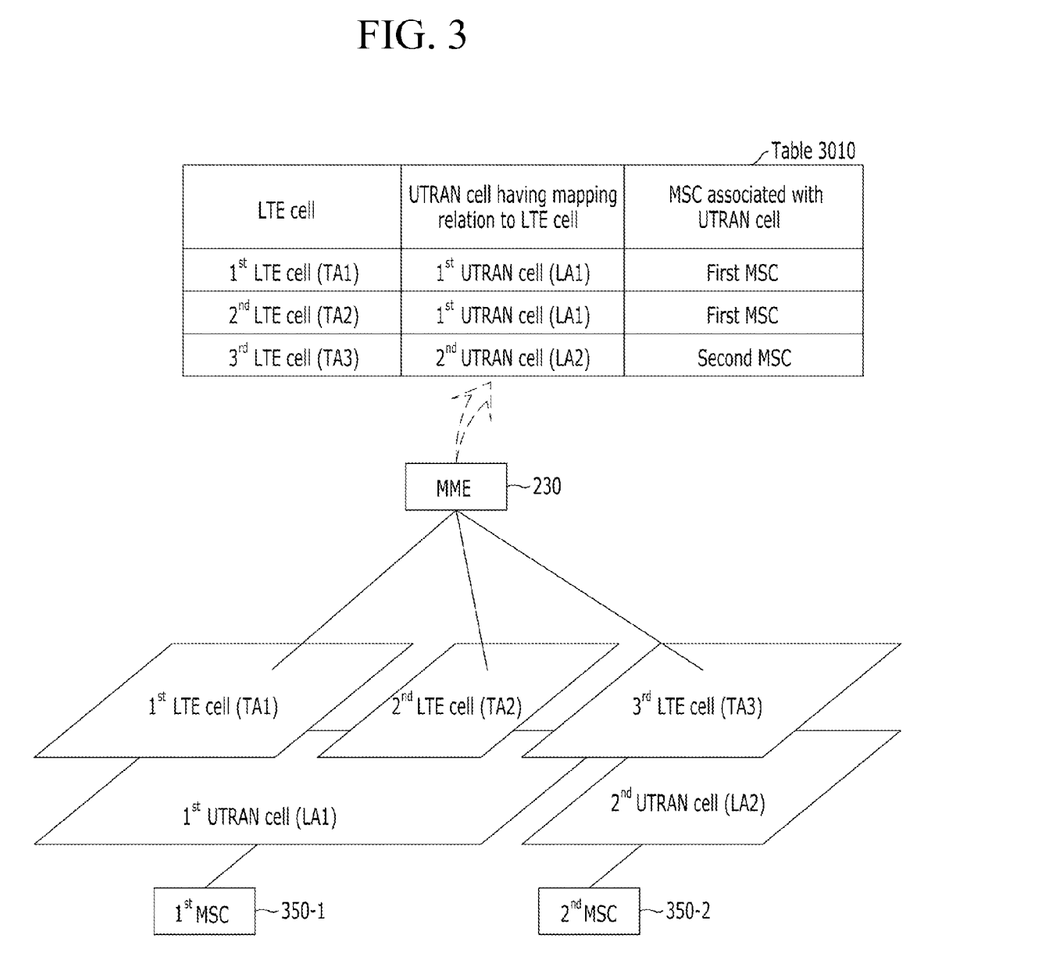
FIG. 3 shows a mapping relation between LTE cells and UTRAN cells in accordance with embodiments of the present invention.

FIG. 3 shows a mapping relation between LTE cells and UTRAN cells in accordance with embodiments of the present invention.

Referring to FIG. 3, MME 230 of LTE network 200 may manage first tracking area TA1, second tracking area TA2, and third tracking area TA3. First mobile switching center 350-1 of UTRAN CS network 300 may manage first location area LA1 and second mobile switching center 350-2 of UTRAN CS network 300 may manage second location area LA2.

Such mapping relations between the tracking areas (TA1, TA2, and TA3) and the location areas (LA1 and LA2) may be stored in mapping table 3010. MME 230 of LTE network 200 may store and manage mapping table 3010. As shown in mapping table 3010, first tracking area TA1 and second tracking area TA2 may be mapped to first location area LA1 managed by first mobile switching center 350-1. Furthermore, third tracking area TA3 may be mapped to second location area LA2 managed by second mobile switching center 350-2.

MME 230 may manage the CS callback service based on mapping table 3010. For example, MME 230 may process a CS callback call of user equipment 100 located at one of first tracking area TA1 and second tracking area TA2 through first mobile switching center 350-1. MME 230 may process a CS callback call of user equipment 100 located at third tracking area TA3 through second mobile switching center 350-2.

Accordingly, MME 230 of LTE network 200 may provide information of first location area LA1 to user equipment 100 that enters into first tracking area TA1 and second tracking area TA2 before the CS fallback procedure is initiated. Furthermore, MME 230 of LTE network 200 may provide information of second location area LA2 to user equipment 100 that enters into third tracking area TA3.

Figure 4:
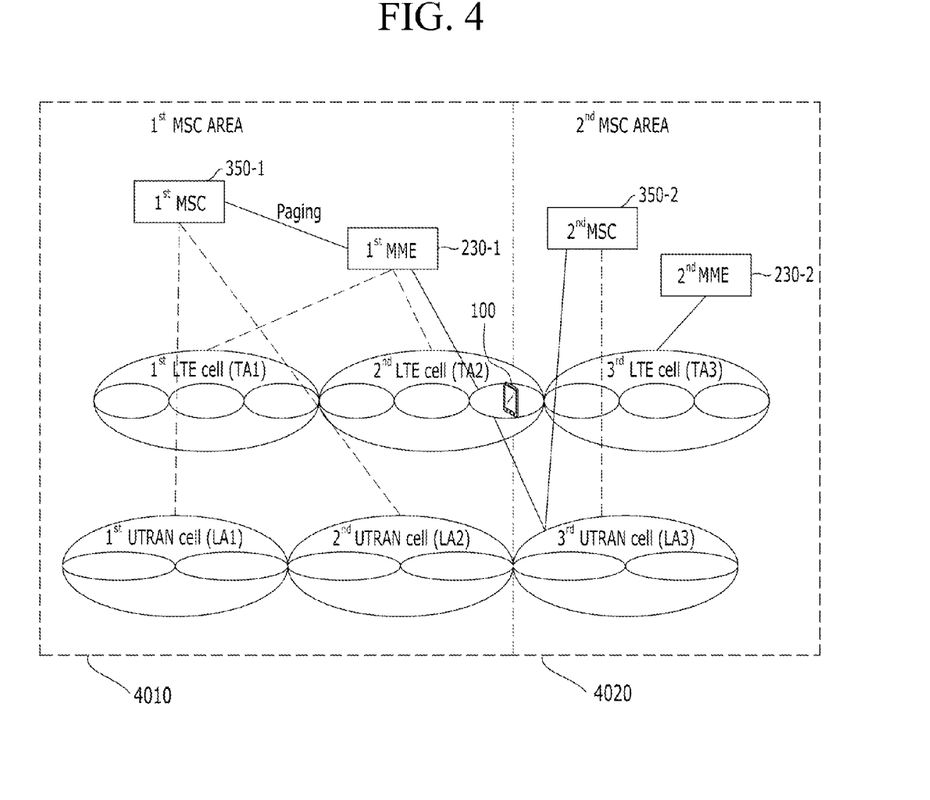
FIG. 4 shows additional location registration caused by location areas managed by two different mobile switching centers in accordance with embodiments of the present invention.

FIG. 4 shows additional location registration caused by location areas managed by two different mobile switching centers in accordance with embodiments of the present invention.

Referring to FIG. 4, a service management area may be divided into first MSC area 4010 and second MSC area 4020. First MSC area 4010 may be managed by first mobile switching center 350-1 and second MSC area 4020 may be managed by second mobile switching center 350-2. First MSC area 4010 may include first location area LA1 and second location area LA2 as well as first tracking area TA1 and second tracking area TA2. Second MSC area 4020 may include third location area LA3 and third tracking area TA3.

As shown in FIG. 4, second tracking area TA2 may be located at an overlapping area of first MSC area 4010 and second MSC area 4020. Accordingly, second tracking area TA2 may be mapped to not only to second location area LA2 but also third location area LA3. That is, second tracking area TA2 may access both of second location area LA2 managed by the first mobile switching center 350-1 and third location area LA3 managed by second mobile switching center 350-2. When user equipment 100 is located at second tracking area TA2, user equipment 100 may receive a paging request from first mobile switching center 350-1 through MME 230 of LTE network 200 for CS fallback. In this case, user equipment 100 should transmit a paging response to first mobile switching center 350-1 managing second location area LA2. However, user equipment 100 may transmit the paging response to second mobile switching center 350-2 managing third location area LA3 because user equipment 100 may be located at $2^{nd}$ MSC area 4020. This might occur due to cell hysteresis. Such cell hysteresis will be described with reference to FIG. 5.

Figure 5:
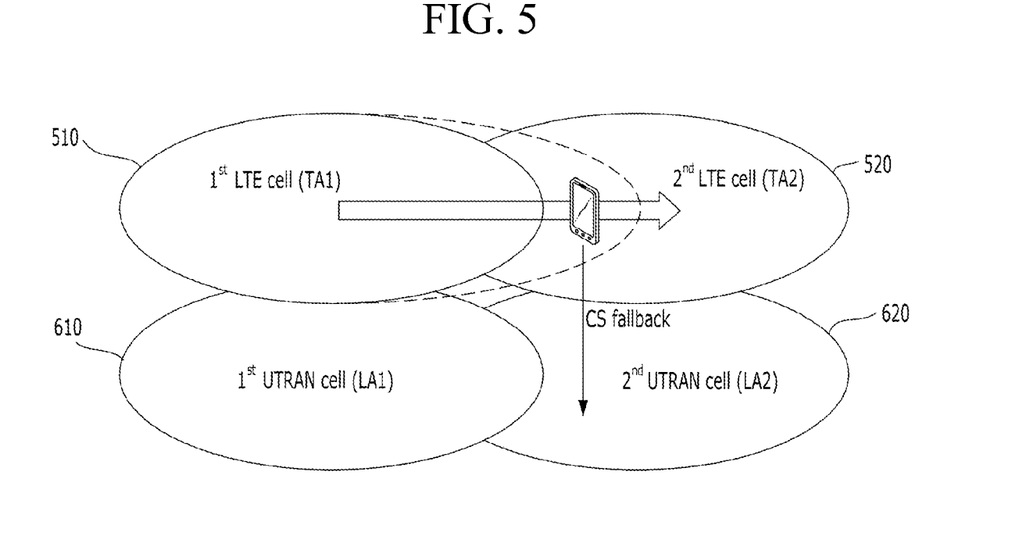
FIG. 5 shows cell hysteresis occurred when user equipment located at a boundary between two adjacent tracking areas in accordance with embodiments of the present invention.

FIG. 5 shows cell hysteresis when user equipment is located at a boundary between two adjacent tracking areas in accordance with embodiments of the present invention.

Referring to FIG. 5, first LTE cell 510 is adjacent to second LTE cell 520. First LTE cell 510 may be referred to as first tracking area TA1 and second LTE cell 520 may be referred to as second tracking area TA2. First LTE cell 510 may be mapped to first UTRAN cell 610 and second LTE cell 520 may be mapped to second UTRAN cell 620. First UTRAN cell 610 may be referred to as first location area LA1 and second UTRAN cell 620 may be referred to as second location area LA2.

When user equipment 100 moves from first LTE cell 510 to second LTE cell 520, handover from first LTE cell 510 to second LTE cell 520 may be delayed due to hysteresis of first LTE cell 510. That is, a service area of first LTE cell 510 may expand toward a service area of second LTE cell 520. The expanded service area of first LTE cell 510 may be shown as the dotted line in FIG. 5. Such cell hysteresis occurs because handover may be initiated when second LTE cell 520 has a communication environment significantly better than first LTE cell 510. For example, when user equipment 100 is located at a boundary area between first and second LTE cells 510 and 520, communication environments of first LTE cell 510 and second LTE cell 520 may be about the same so handover may not be initiated. When user equipment 100 enters further into a service area of second LTE cell 520, the communication environment of second LTE cell 520 may become noticeably improved as compared to that of first LTE cell 510.

When user equipment 100 may be located at such a boundary area and performs a CS fallback procedure for a voice call service, user equipment 100 may transmit a paging response to second location area LA2 mapped to second tracking area TA2 although user equipment 100 receives a paging request through first location area LA1 which is mapped to first tracking area TA1. Accordingly, user equipment 100 may need to additionally perform a location registration procedure in order to establish connection to an undesired cell such as second location area LA2, thereby generating a call setup delay.

In order to prevent such unintentional location registration and the call setup delay, a CS fallback hysteresis parameter may be defined and information thereof may be provided to eNodeB 210 and/or user equipment 100 in accordance with embodiments of the present invention. A CS fallback target base station may be selected based on the CS fallback hysteresis parameter in accordance with embodiments of the present invention. Particularly, such a CS fallback target base station may be selected when information on a cell of a location area mapped to a serving cell of a tracking area is provided to user equipment 100 in accordance with embodiments of the present invention. Hereinafter, an apparatus for effectively selecting a target base station for CS fallback in accordance with embodiments of the present invention will be described with reference to FIG. 6. Such an apparatus may be realized as an independent apparatus or in a LTE cell base station. For convenience and ease of understanding, the apparatus will be described as being included in a LTE cell base station.

Figure 6:
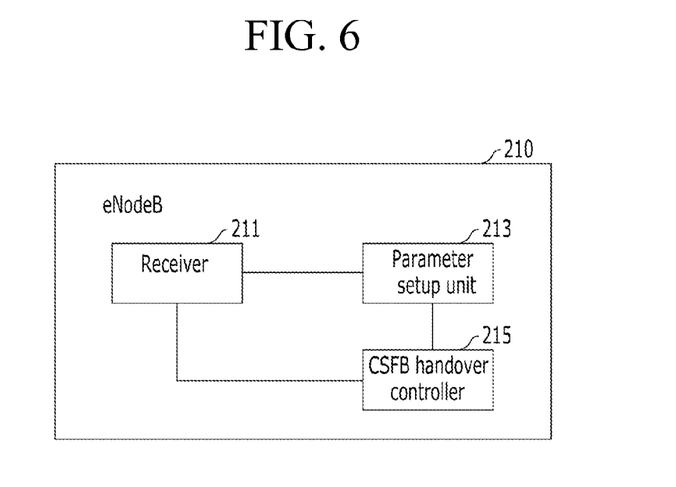
FIG. 6 is an apparatus for effectively selecting a target non-LTE cell for CS fallback in accordance with embodiments of the present invention.

FIG. 6 shows an apparatus for effectively selecting a CS fallback target base station in accordance with embodiments of the present invention.

Referring to FIG. 6, the apparatus may be eNodeB 210 of LTE network 200. The apparatus may include receiver 211, parameter setup unit 213, and circuit switched fallback (CSFB) handover controller 215.

Parameter setup unit 213 may set a CS fallback parameter with a predetermined value. Parameter setup unit 213 may determine the predetermined value of the CS fallback parameter corresponding to a type of a signal quality measured by user equipment 100. The type of a signal quality measured in user equipment 100 may be one of a received signal code power (RSCP) and a signal to noise ratio (SINR).

Receiver 211 may receive signal quality measurement of non-LTE cells associated with a serving LTE cell where user equipment 100 is camped. Referring back to FIG. 4, the serving LTE cell may be $2^{nd}$ LTE cell (TA2) and the non-LTE cells may be $2^{nd}$ UTRAN cell (LA2) and $3^{rd}$ UTRAN cell (LA3). That is, user equipment 100 may measure signal qualities of $2^{nd}$ UTRAN cell and $3^{rd}$ UTRAZ cell and transmit the measurement results to eNodeB 210. As described above, the signal quality measurement is a result of measuring a RSCP or a SINR of a corresponding UTRAN cell.

CS fallback handover controller 215 may select one of the non-LTE cells associated with the serving LTE cell, as the target cell, for CS fallback based on the CS fallback parameter and the received quality measurements. For example, CS fallback handover controller 215 may select one of $2^{nd}$ UTRAN cell and $3^{rd}$ UTRAN cell based on the CS fallback parameter and the received signal quality measurements of $2^{nd}$ UTRAN cell and $3^{rd}$ UTRAN cell. In accordance with embodiments of the present invention, CS fallback handover controller 215 may add the CS fallback hysteresis parameter to the received signal quality measurement of the non-LTE cell mapped to the serving LTE cell and compare the adding result with the received signal quality measurement of the other non-LTE cell mapped to a neighbor LTE cell where user equipment 100 enters into. CS fallback handover controller 215 may determine, as the target cell, the non-LTE cell mapped to the serving LTE cell when the adding result is equal to or greater than the signal quality measurement of the other non-LTE cell. Otherwise, CS fallback handover controller 215 may determine the other non-LTE cell as the target cell for CS fallback. Furthermore, CS fallback handover controller 215 may provide information on the selected target cell to user equipment 100. Referring back to FIG. 1, eNodeB 210 may receive information on NodeB 310 through MSC 250 and provide the received information to user equipment 100 before the CS fallback procedure. The CS fallback procedure may be performed using the selected target cell for providing a CS service to user equipment 100 camping on a LTE cell.

As described above, a target non-LTE cell base station may be selected by applying a CS fallback hysteresis parameter to a non-LTE cell base station mapped to a serving LTE cell base station. For convenience and ease of understanding, a non-LTE cell base station may be described as a UTRAN cell base station, but the present invention is not limited thereto.

Figure 7:
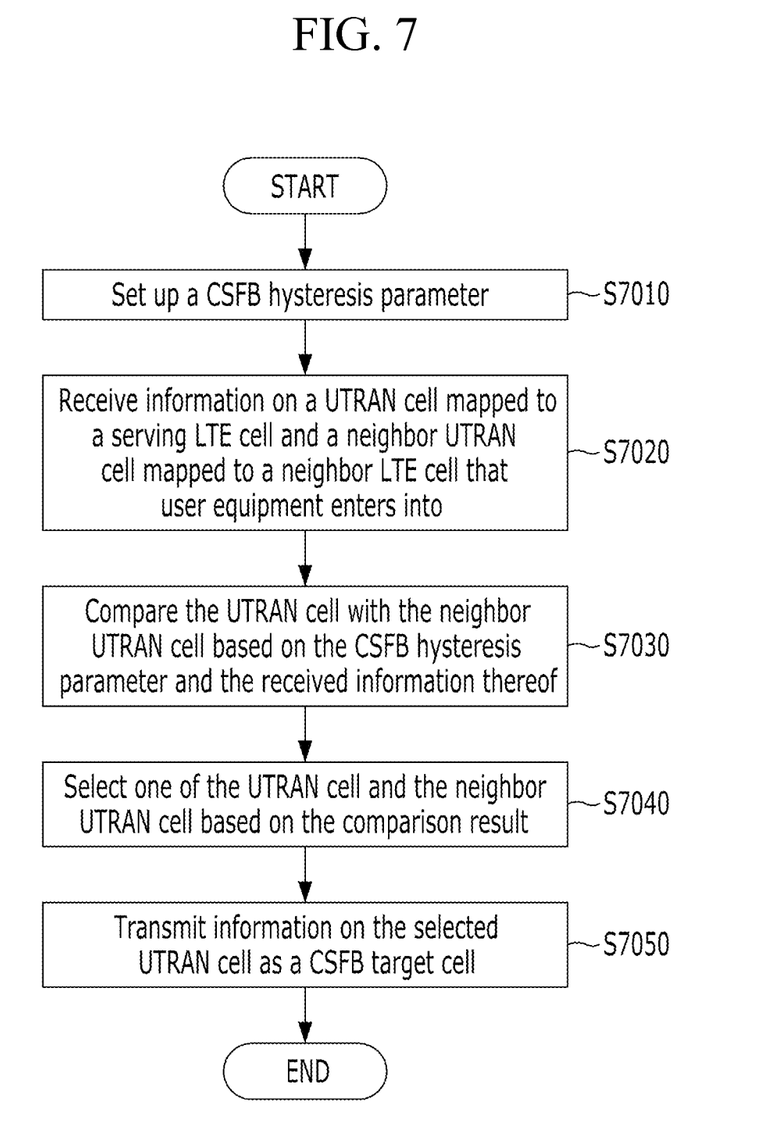
FIG. 7 is a flowchart showing a method for effectively selecting a target non-LTE cell for CS fallback in accordance with embodiments of the present invention.

FIG. 7 is a flowchart showing a method for effectively selecting a target non-LTE cell for CS fallback in accordance with embodiments of the present invention.

Referring to FIG. 7, a CS fallback hysteresis parameter may be set up at step S7010. The CS fallback hysteresis parameter may be a weighting added to a non-LTE cell base station mapped to a serving LTE cell base station in order to increase a chance of selecting the non-LTE cell base station mapped to the serving LTE cell base station when active user equipment performs a CS fallback procedure. In accordance with embodiments of the present invention, the CS fallback hysteresis parameter may be determined and set up with a predetermined value in order to efficiently select a target non-LTE cell when active user equipment 100 performs a CS fallback procedure. For example, the CS fallback hysteresis parameter may have an integer value and added to a signal quality measurement of a non-LTE cell base station mapped to a current serving LTE cell base station. The signal quality measurement of a non-LTE cell base station may be at least one of a received signal code power (RSCP) and a signal to noise ratio (SINR) of each non-LTE cell base station associated with a serving LTE cell base station. By adding the CS fallback hysteresis parameter to the signal quality measurement of a non-LTE cell base station mapped to a serving LTE cell base station, a chance of selecting the non-LTE cell base station mapped to the serving LTE cell may increase during the CS fallback procedure.

Such a CS fallback hysteresis parameter may be defined and set up by a service provider in consideration of various factors related to telecommunication environments. For example, when a value for the CS fallback hysteresis parameter is set comparatively high, a chance of CS fallback handover from a serving LTE cell to a UTRAN cell mapped to the serving LTE cell increases. That is, there is a low chance to initiate an additional location registration procedure. When the value of the CS fallback hysteresis parameter is too high, however, service quality may be degraded because user equipment 100 already enters into a service area of a neighbor UTRAN cell mapped to a neighbor LTE cell of the current serving LTE cell and a signal quality of the neighbor UTRAN cell is significantly better than that of the UTRAN cell mapped to the serving LTE cell. When the value of the CS fallback hysteresis parameter is set comparatively low, a chance of CSFB handover from the serving LTE cell to a UTRAN cell mapped to the serving LTE cell may decrease. That is, an additional location registration procedure is generally required because the neighbor UTRAN cell may be undesirably selected as a target cell base station for CS fallback. Accordingly, a call setup delay occurs.

As described above, the CS fallback hysteresis parameter may be set up in consideration of the chance of initiating a location registration procedure and the signal quality. Such a CS fallback hysteresis parameter may be determined by a service provider and stored in a LTE cell base station. The present invention, however, is not limited thereto. The CS fallback hysteresis parameter may be dynamically and/or automatically set up by a LTE cell base station in consideration of various telecommunication environmental factors.

At step S7020, information on a UTRAN cell mapped to a serving LTE cell and information on a neighbor UTRAN cell mapped to a LTE cell adjacent to the serving LTE cell may be collected. For example, user equipment 100 may measure a signal quality Q1 of a UTRAN cell mapped to a serving LTE cell that user equipment 100 is currently camping on. Furthermore, user equipment 100 may measure a signal quality Q2 of a neighbor UTRAN cell mapped to a neighbor LTE cell adjacent to the serving LTE cell. The neighbor LTE cell may be a LTE cell that user equipment 100 enters into. Referring back to FIG. 4, the serving LTE cell may be $2^{nd}$ LTE cell (TA2) and the neighbor LTE cell may be $3^{rd}$ LTE cell (TA3). Accordingly, the UTRAN cell mapped to the serving LTE cell is $2^{nd}$ UTRAN cell (LA2) and the neighbor UTRAN cell mapped to the neighbor LTE cell is $3^{rd}$ UTRAN cell (LA3). In this case, user equipment 100 may measure a signal quality Q1 of the $2^{nd}$ UTRAN cell and a signal quality Q2 of the $3^{rd}$ UTRAN cell. Such measured qualities Q1 and Q2 may be transmitted to a serving LTE cell base station, for example, eNodeB 210. For example, the measured Q1 and Q2 may be at least one of a RSCP and a SINR, but the present invention is not limited thereto. Particularly, receiver 211 of eNodeB 210 may receive system information (SI) of the UTRAN cell (LA1) and the neighbor UTRAN cell (LA2). The information on first signal quality Q1 and second signal quality Q2 may be provided with the system information.

At step S7030, the UTRAN cell and the neighbor UTRAN cell may be compared based on the CS fallback hysteresis parameter and the collected quality information. For example, the CS fallback hysteresis parameter may be added to the first signal quality Q1 of the UTRAN cell mapped to the serving LTE cell. The result of this adding may be compared with the second signal quality Q2 of the neighbor UTRAN cell mapped to the neighbor LTE cell adjacent to the serving LTE cell. The neighbor LTE cell may be a LTE cell that user equipment 100 enters into.

CSFB handover controller 215 of eNodeB 210 may receive system information of first location area LA1 and second location area LA2 from associated NodeBs through MSCs 350. CSFB handover controller 215 may add the defined CS fallback hysteresis parameter to the measured quality information of first UTRAN cell (LA1). Then, CSFB handover controller 215 may compare the adding result with the measured quality information of second UTRAN cell LA2.

At step S7040, a CS fallback target cell may be determined based on the comparison result. For example, a CS fallback target cell may be determined as follows. Table 2 shows conditions for selecting a CS fallback target cell based on the comparison result.

TABLE 2

| Condition | Selection |
|---|---|
| Q1 + CSFB Hysteresis >= Q2 | Select a first UTRAN cell as a CSFB target cell |
| Q1 + CSFB Hysteresis < Q2 | Select a second UTRAN cell as a CSFB target cell |

When the adding result (the first signal quality Q1+CS fallback hysteresis parameter) is greater than or equal to the second signal quality Q2, the UTRAN cell mapped to the serving LTE cell may be selected as the CS fallback target cell. When the adding result is smaller than the second signal quality Q2, the neighbor UTRAN cell mapped to the neighbor LTE cell may be selected as the CS fallback target cell. That is, the CS fallback hysteresis parameter may be a weight added to the UTRAN cell mapped to the current serving LTE cell in order to increase the change of selecting the UTRAN cell for CS fallback in accordance with embodiments of the present invention.

At step S7050, the information on the selected CS fallback target cell may be provided. For example, the information on the selected CS fallback target cell may be provided to user equipment 100. Such selected CS fallback target cell information may be provided when system information (SI) of base stations is provided in a Redirection with SI handover and a PS handover.

Since the UTRAN cell mapped to the serving LTE cell has a comparatively greater chance to be selected as the CS fallback target cell, a chance of performing additional location registration may be comparatively low. Accordingly, a call setup delay may be prevented in accordance with embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of selecting one of cells of a second network, as a target cell for handover of user equipment camping on a serving cell of a first network when the user equipment requests a circuit switched (CS) service, where the first network provides only a packet switched (PS) service, the second network provides a circuit switched (CS) service, and the first network overlaps with the second network, the method comprising:

determining a CS fallback hysteresis parameter;

receiving a first signal quality measurement of a first candidate cell of the second network and a second signal quality measurement of a second candidate cell of the second network; and selecting one target cell between the first candidate cell and the second candidate cells of the second network based on the CS fallback hysteresis parameter and the received first and second signal quality measurements, wherein the selecting one target cell includes:

adding the CS fallback hysteresis parameter to the first received signal quality measurement of the first candidate cell;

comparing the adding result with the second received signal quality measurement of the second candidate cell; and selecting, as the target cell, one of the first candidate cell and the second candidate cell based on the comparison result, and wherein the first candidate cell is mapped to the serving cell of the first network and the second candidate cell is mapped to a neighbor cell of the first network where the user equipment enters into.

2. The method of claim 1, wherein the CS fallback hysteresis parameter is a predetermined value added to the received signal quality measurements of one candidate cell mapped to a serving cell of the first network, which the user equipment is currently camping on.

3. The method of claim 1, wherein the determining a CS fallback hysteresis parameter includes:
setting the CS fallback hysteresis parameter with a predetermined value based on a type of signal quality measured as the signal quality measurement of the at least two candidate cells of the second network.

4. The method of claim 1, wherein the signal quality measurement is a result of measuring a signal quality of each candidate cell of the second network.

5. The method of claim 4, wherein the signal quality is one of a received signal code power (RSCP) and a signal to interference noise ratio (SINR).

6. The method of claim 1, wherein the receiving signal quality measurements of at least two candidate cells of the second network includes:
measuring, by the user equipment, a first signal quality of the first candidate cell and a second signal quality of the second candidate cell; and
transmitting, by the user equipment, results of the measuring of the first signal quality and the second signal quality to the serving cell of the first network.

7. The method of claim 1, wherein the selecting the target cell includes:
selecting the first candidate cell as the target cell when the adding result is equal to or greater than the second received signal quality of the second candidate cell; and
selecting the second candidate cell as the target cell when the adding result is smaller than the second received signal quality of the second candidate cell.

8. The method of claim 1, wherein the first network is a long term evolution (LTE) network and the second network is a universal mobile telecommunications system radio access network (UTRAN).

9. The method of claim 1, further comprising:
performing a CS fallback procedure with the selected target cell.

10. A method of selecting, in a long term evolution (LTE) cell, one of non-LTE cells as a target cell for circuit switched (CS) fallback in a communication environment where a LTE network overlaps with a non-LTE network, the method comprising:
selecting one of a first non-LTE candidate cell and a second non-LTE candidate cell as the target cell based on a CS fallback hysteresis parameter and first and second signal quality measurements of the first and second non-LTE candidate cells; and
performing a CS fallback procedure based on the selected target non-LTE cell,
wherein the first non-LTE candidate cell is mapped to a serving LTE cell where user equipment is currently camping on, and the second non-LTE candidate cell is mapped to a neighbor LTE cell that the user equipment enters into, and wherein the selecting one non-LTE cell includes:
adding the CS fallback hysteresis parameter to the first signal quality measurement of the first non-LTE candidate cell;
comparing the adding result with the second signal quality measurement of the second non-LTE candidate cell;
determining the first non-LTE candidate cell as the target cell for CS fallback when the adding result is equal to or greater than the second signal quality measurement of the second non-LTE candidate cell;
otherwise, determining the second non-LTE candidate cell as the target cell.

11. The method of claim 10, further comprising:
setting the CS fallback parameter with a predetermined value corresponding to a type of a signal quality measured in the user equipment,
wherein the type of a signal quality measured in the user equipment is one of a received signal code power (RSCP) and a signal to noise ratio (SINR).

12. The method of claim 10, wherein the selecting one of a first non-LTE candidate cell and a second non-LTE candidate cell as the target cell includes:
determining the first non-LTE candidate cell and the second non-LTE candidate cell based on a mapping table stored in the serving LTE cell,
wherein the mapping table contains information on mapping relations of LTE cells and non-LTE cells.

13. An apparatus for selecting one of non-LTE cells as a target cell for circuit switched (CS) fallback in a communication environment where a LTE network overlaps with a non-LTE network, the apparatus comprising:
a parameter setup unit configured to set a CS fallback parameter with a predetermined value;
a receiver configured to receive, from user equipment, a first signal quality measurement of a first non-LTE candidate cell and a second signal quality measurement of a second non-LTE candidate cell; and
a CS fallback handover controller configured to select one of the first non-LTE candidate cell and the second non-LTE candidate cell as the target cell for CS fallback based on the CS fallback parameter and the received first and second quality measurements,
wherein the first non-LTE candidate cell is mapped to a serving LTE cell associated with the apparatus, and the second non-LTE candidate cell is mapped to a neighbor LTE cell of the serving LTE cell, and
wherein the CS fallback handover controller is configured to:
add the CS fallback hysteresis parameter to the received first signal quality measurement of the first non-LTE candidate cell;
compare the adding result with the received second signal quality measurement of the second non-LTE candidate cell;
determine the first non-LTE candidate cell as the target cell for CS fallback when the adding result is equal to or greater than the second signal quality measurement of the second non-LTE candidate cell;
otherwise, determine the second non-LTE candidate cell as the target cell.

14. The apparatus of claim 13, wherein the parameter setup unit is configured to:

determine the predetermined value of the CS fallback parameter corresponding to a type of a signal quality measured in the user equipment; and the type of a signal quality measured in the user equipment is one of a received signal code power (RSCP) and a signal to noise ratio (SINR).

15. The apparatus of claim 13, wherein the apparatus is embodied in an evolved NodeB (eNodeB).

16. The apparatus of claim 15, wherein the apparatus is configured to initiate handover of the user equipment to the selected target cell during a CS fallback procedure.

* * * * *